(12) United States Patent　　(10) Patent No.: US 9,060,012 B2
Eisen　　(45) Date of Patent: Jun. 16, 2015

(54) METHODS AND APPARATUS FOR DETECTING FRAUD WITH TIME BASED COMPUTER TAGS

(75) Inventor: Ori Eisen, Scottsdale, AZ (US)

(73) Assignee: THE 41ST PARAMETER, INC., Scottsdale, AZ (US)

( * ) Notice: Subject to any disclaimer, the term of this patent is extended or adjusted under 35 U.S.C. 154(b) by 0 days.

(21) Appl. No.: 11/862,165

(22) Filed: Sep. 26, 2007

(65) Prior Publication Data
US 2009/0083184 A1　Mar. 26, 2009

(51) Int. Cl.
*H04L 29/06*　(2006.01)
*G06Q 20/10*　(2012.01)
*G06Q 20/40*　(2012.01)

(52) U.S. Cl.
CPC ......... *H04L 63/1408* (2013.01); *H04L 63/0823* (2013.01); *G06Q 20/10* (2013.01); *G06Q 20/4016* (2013.01); *H04L 63/1466* (2013.01); *H04L 2463/121* (2013.01); *H04L 69/28* (2013.01)

(58) Field of Classification Search
USPC ............................. 726/2, 27; 705/64; 713/155
See application file for complete search history.

(56) References Cited

U.S. PATENT DOCUMENTS

| | | |
|---|---|---|
| 5,748,740 A | 5/1998 | Curry et al. |
| 5,764,275 A | 6/1998 | Lappington et al. |
| 5,892,900 A | 4/1999 | Ginter et al. |
| 6,092,053 A | 7/2000 | Boesch et al. |
| 6,105,012 A | 8/2000 | Chang et al. |
| 6,112,240 A | 8/2000 | Pogue et al. |
| 6,148,407 A | 11/2000 | Aucsmith |
| 6,163,771 A | 12/2000 | Walker et al. |
| 6,205,436 B1 | 3/2001 | Rosen |
| 6,678,666 B1 | 1/2004 | Boulware |
| 6,718,363 B1 | 4/2004 | Ponte |
| 6,892,307 B1 | 5/2005 | Wood et al. |

(Continued)

FOREIGN PATENT DOCUMENTS

| | | |
|---|---|---|
| EP | 0418144 A1 | 3/1991 |
| EP | 0923039 A1 | 6/1999 |

(Continued)

OTHER PUBLICATIONS

Derfler, et al. How Network Work. Millennium Ed., Que Corporation. Indianapolis. IN. 2000.
Gralla, Preston. How the Internet Works. Millennium Ed., Que Corporation. Indianapolis, IN 1999.

(Continued)

*Primary Examiner* — Tsan-Yu J Huang
(74) *Attorney, Agent, or Firm* — Wilson Sonsini Goodrich & Rosati (57) ABSTRACT

Systems and methods for creating and analyzing computer tag information for the prevention or detection of potential fraud. Computers and other devices accessing the Web carry device tags with date and time information describing when they were issued by a security tag server. A server time stamp may be inserted into time based computer tags such as a cookies indicating when they were created. Such time stamp information can be encrypted and analyzed during future attempts to access a secure network such as a customer attempting to log into an online banking account. When the time stamp information from the tag is compared to other selected information about the user, device and/or account, including but not limited to last account log-in date/time or account creation date, the invention may be used to detect suspicious activity.

12 Claims, 3 Drawing Sheets

(56) References Cited

U.S. PATENT DOCUMENTS

| | | | |
|---|---|---|---|
| 6,895,507 B1 * | 5/2005 | Teppler | 726/19 |
| 6,898,709 B1 | 5/2005 | Teppler | |
| 6,908,030 B2 | 6/2005 | Rajasekaran et al. | |
| 6,957,339 B2 * | 10/2005 | Shinzaki | 713/186 |
| 7,089,585 B1 | 8/2006 | Dharmarajan | |
| 7,100,049 B2 | 8/2006 | Gasparini et al. | |
| 7,165,051 B2 | 1/2007 | Ronning et al. | |
| 7,191,467 B1 | 3/2007 | Dujari et al. | |
| 7,260,837 B2 | 8/2007 | Abraham et al. | |
| 7,272,728 B2 | 9/2007 | Pierson et al. | |
| 7,330,871 B2 | 2/2008 | Barber | |
| 7,349,955 B1 | 3/2008 | Korb et al. | |
| 7,438,226 B2 | 10/2008 | Helsper et al. | |
| 7,577,620 B1 | 8/2009 | Donner | |
| 7,853,533 B2 | 12/2010 | Eisen | |
| 8,151,327 B2 | 4/2012 | Eisen | |
| 8,826,393 B2 | 9/2014 | Eisen | |
| 8,862,514 B2 | 10/2014 | Eisen | |
| 2001/0016876 A1 | 8/2001 | Kurth et al. | |
| 2002/0035622 A1 | 3/2002 | Barber | |
| 2002/0056042 A1 | 5/2002 | Van Der Kaay et al. | |
| 2002/0073046 A1 | 6/2002 | David | |
| 2002/0073327 A1 * | 6/2002 | Vellandi | 713/193 |
| 2002/0112171 A1 * | 8/2002 | Ginter et al. | 713/185 |
| 2002/0153424 A1 | 10/2002 | Li | |
| 2002/0156836 A1 | 10/2002 | Janosik, Jr. et al. | |
| 2002/0167965 A1 | 11/2002 | Beasley et al. | |
| 2003/0033356 A1 | 2/2003 | Tran et al. | |
| 2003/0070080 A1 | 4/2003 | Rosen | |
| 2003/0076242 A1 | 4/2003 | Burns et al. | |
| 2003/0105854 A1 | 6/2003 | Thorsteinsson et al. | |
| 2003/0115334 A1 | 6/2003 | Bhat et al. | |
| 2003/0172036 A1 | 9/2003 | Feigenbaum | |
| 2003/0182551 A1 | 9/2003 | Frantz et al. | |
| 2003/0208684 A1 | 11/2003 | Camacho et al. | |
| 2003/0233553 A1 | 12/2003 | Parks et al. | |
| 2004/0006553 A1 | 1/2004 | de Vries et al. | |
| 2004/0034794 A1 | 2/2004 | Mayer et al. | |
| 2004/0105431 A1 | 6/2004 | Monjas-Llorente et al. | |
| 2004/0117321 A1 | 6/2004 | Sancho | |
| 2004/0181598 A1 | 9/2004 | Paya et al. | |
| 2004/0203750 A1 | 10/2004 | Cowdrey et al. | |
| 2004/0236696 A1 | 11/2004 | Aoki et al. | |
| 2004/0236702 A1 | 11/2004 | Fink et al. | |
| 2004/0254890 A1 | 12/2004 | Sancho et al. | |
| 2005/0033653 A1 | 2/2005 | Eisenberg et al. | |
| 2005/0033703 A1 | 2/2005 | Holdsworth | |
| 2005/0076230 A1 | 4/2005 | Redenbaugh et al. | |
| 2005/0108177 A1 | 5/2005 | Sancho | |
| 2005/0113092 A1 | 5/2005 | Coppinger et al. | |
| 2005/0131826 A1 | 6/2005 | Cook | |
| 2005/0188423 A1 | 8/2005 | Motsinger et al. | |
| 2005/0278542 A1 | 12/2005 | Pierson et al. | |
| 2006/0010072 A1 | 1/2006 | Eisen | |
| 2006/0048211 A1 | 3/2006 | Pierson et al. | |
| 2006/0130132 A1 | 6/2006 | Dharmarajan | |
| 2006/0155985 A1 | 7/2006 | Canard et al. | |
| 2006/0200855 A1 | 9/2006 | Willis | |
| 2006/0200856 A1 | 9/2006 | Salowey et al. | |
| 2006/0264202 A1 | 11/2006 | Hagmeier et al. | |
| 2006/0281541 A1 | 12/2006 | Nguyen et al. | |
| 2006/0282660 A1 | 12/2006 | Varghese et al. | |
| 2006/0287902 A1 | 12/2006 | Helsper et al. | |
| 2007/0038568 A1 | 2/2007 | Greene et al. | |
| 2007/0043837 A1 | 2/2007 | Kruse et al. | |
| 2007/0073630 A1 | 3/2007 | Greene et al. | |
| 2007/0204044 A1 | 8/2007 | Rice et al. | |
| 2007/0220594 A1 | 9/2007 | Tulsyan | |
| 2007/0234070 A1 | 10/2007 | Horning et al. | |
| 2007/0234409 A1 | 10/2007 | Eisen | |
| 2007/0239606 A1 | 10/2007 | Eisen | |
| 2007/0294401 A1 | 12/2007 | Shkedi | |
| 2008/0010678 A1 | 1/2008 | Burdette et al. | |
| 2008/0104672 A1 | 5/2008 | Lunde | |
| 2008/0104684 A1 | 5/2008 | Lunde | |
| 2008/0133420 A1 | 6/2008 | Barber | |
| 2009/0037213 A1 | 2/2009 | Eisen | |
| 2010/0004965 A1 | 1/2010 | Eisen | |
| 2011/0082768 A1 | 4/2011 | Eisen | |
| 2012/0174223 A1 | 7/2012 | Eisen | |

FOREIGN PATENT DOCUMENTS

| | | |
|---|---|---|
| EP | 1256911 A1 | 11/2002 |
| WO | WO 01/11450 A1 | 2/2001 |
| WO | WO 01/95550 A2 | 12/2001 |
| WO | WO 02/091226 A1 | 11/2002 |
| WO | WO 03/025868 A1 | 3/2003 |
| WO | WO 03/075197 A2 | 9/2003 |
| WO | WO 03/075197 A3 | 12/2003 |
| WO | WO 2004/038997 A1 | 5/2004 |

OTHER PUBLICATIONS

White, Ron. How Computers Work. Millennium Ed., Que Corporation. Indianapolis, IN. 1999.
Kohno, et al. Remote Physical Device Fingerprinting. 2005 IEEE Syposium on Security and Privacy (IEEE S&P 2005); May 8-11, 2005; Oakland, California, U.S.A. 16 pages.
Manavoglu, et al. Probabilistic user behavior models. Data Mining. 2003; 203-210.
U.S. Appl. No. 12/732,034, entitled "Systems and Methods of Sharing Iinformation Through a Tag-Based Consortium", filed Mar. 25, 2010, Eisen.
International search report dated Oct. 29, 2007 for PCT Application No. US2005/35532.
International search report dated Jul. 3, 2008 for PCT Application No. US2007/65776.
Office action dated Mar. 26, 2013 for U.S. Appl. No. 12/248,867.
Office action dated Mar. 27, 2013 for U.S. Appl. No. 12/496,572.
Office action dated Oct. 2, 2013 for U.S. Appl. No. 12/496,572.
European search report dated Dec. 23, 2011 for Application No. 5818903.6.
Office action dated Sep. 10, 2013 for U.S. Appl. No. 13/414,678.
Notice of allowance dated Jan. 3, 2012 for U.S. Appl. No. 11/694,882.
Notice of allowance dated Apr. 30, 2014 for U.S. Appl. No. 13/414,678.
Notice of allowance dated Jun. 10, 2014 for U.S. Appl. No. 12/248,867.
Notice of allowance dated Jun. 24, 2010 for U.S. Appl. No. 11/241,739.
Office action dated Sep. 19, 2014 for U.S. Appl. No. 12/732,034.
U.S. Appl. No. 14/473,818, filed Aug. 29, 2014, Eisen.
European search report and written opinion dated Nov. 15, 2010 for Application No. 08165224.0.
Office action dated Mar. 13, 2014 for U.S. Appl. No. 12/732,034.
Office action dated Jan. 6, 2010 for U.S. Appl. No. 11/241,739.
Office action dated Feb. 24, 2009 for U.S. Appl. No. 11/694,882.
Office action dated Mar. 3, 2008 for U.S. Appl. No. 11/241,739.
Office action dated Mar. 4, 2010 for U.S. Appl. No. 12/248,867.
Office action dated Mar. 9, 2009 for U.S. Appl. No. 11/241,739.
Office action dated Mar. 14, 2012 for U.S. Appl. No. 12/892,868.
Office action dated Apr. 20, 2012 for U.S. Appl. No. 12/732,034.
Office action dated May 9, 2008 for U.S. Appl. No. 10/791,439.
Office action dated Jun. 1, 2011 for U.S. Appl. No. 11/694,882.
Office action dated Jun. 11, 2008 for U.S. Appl. No. 11/694,882.
Office action dated Jul. 1, 2009 for U.S. Appl. No. 11/241,739.
Office action dated Aug. 23, 2010 for U.S. Appl. No. 11/694,882.
Office action dated Sep. 16, 2008 for U.S. Appl. No. 11/241,739.
Office action dated Nov. 15, 2012 for U.S. Appl. No. 12/732,034.
Office action dated Nov. 19, 2012 for U.S. Appl. No. 12/892,868.
Office action dated Nov. 22, 2010 for U.S. Appl. No. 12/248,867.
Office action dated Dec. 7, 2007 for U.S. Appl. No. 10/791,439.
Office action dated Dec. 23, 2009 for U.S. Appl. No. 11/694,882.
"Office action dated Mar. 19, 2015 for U.S. Appl. No. 12/496,572.".

* cited by examiner

FIG. 1

| TAG | TIME STAMP |
|---|---|
| TAG #1 | 7/12/07 |
| TAG #2 | 6/10/07 |
| TAG #3 | 5/1/06 |
| TAG #4 | 7/15/07 |
| TAG #5 | 7/14/07 |
| ••• | ••• |

METHODS AND APPARATUS FOR DETECTING FRAUD WITH TIME BASED COMPUTER TAGS

FIELD OF INVENTION

The invention relates generally to the field of network security, including the detection and prevention of fraudulent transactions or identity theft. More particularly, the invention relates to detecting possible fraudulent transactions online by analyzing time based computer tags.

BACKGROUND OF INVENTION

The Internet is a tool for everyday use for everyday types of applications. Businesses are increasingly using the Internet as a method of communicating with customers, vendors, employees and conducting business transactions. Conducting business on the Internet is efficient and cost effective, particularly when services and information can be distributed electronically. At the same time it also creates added risk of loss and damage by hackers, identity theft, stolen credit cards, and fraudulent activities. One of the most fundamental problems with network security is user authentication—are the people gaining network access authentic or who they claim to be.

A number of strategies are commonly employed to make it relatively safer to use the Internet and to facilitate communications and online business transactions. Login names and passwords are one of the most widely used and accepted forms of basic network security. This may be considered a first or primary authentication factor based on something users know or keep in their minds. Online access is provided upon entry of an exact user login/password combination. The identification of valid login names is often trivial, particularly on systems where they are apparently visible or follow a predictable common login format, such as "firstname_lastname" or "firstinitial_lastname." It is also difficult to secure password information given natural human tendencies. End users often adopt common or simple passwords, share passwords, write down passwords, or select passwords that can be readily guessed. User login and passwords therefore only provide a basic level of security that is not solely relied upon, particularly for financial networks accessible via the Internet such as online banking systems.

A secondary level or factor of authentication may be relied upon for added security based on something users have in their possession, such as a special purpose hardware device. For example, after entering a valid user name and password to access a network, the device such as a token may provide a user with a code as part of the login process. The code may be a six digit number that changes at regularly timed intervals and must usually be entered into a device within a specified amount of time. The token thus provides a secondary code/password for the user to enter as part of the login process. Alternatively, another hardware security device referred to sometimes as a "dongle" may be physically connected to a computer interface such as a USB port. This device may sometimes be used to identify end users connecting from a particular device. A fixed system component serial number and other hardware methods used to uniquely identify specific network devices are also used to limit access to "known" devices. Unfortunately, these methods are plainly visible to the world and can be copied or simulated. These systems provide more security but are not perfect and can be impractical in protecting large networks accessible by a large number of users or customers. There is usually a high cost of ownership for such added security measures which are also intrusive and takes away from the user experience.

Other user authentication solutions are available today involving services provided from third parties. For example, the use of digital certificates and trusted third party Certificate Authorities (CAs) are an increasingly popular way of ensuring that the party connecting to a network is indeed who they claim to be. Unfortunately, digital certificates can be copied and stolen. Moreover, significant trust must be placed in third party verification groups that do not have a direct vested interest in or knowledge of the secured networks that are relying upon them. The requirement for network users to utilize certificates can also create a significant burden on users of large networks, particularly for customers of financial or banking institutions.

An Internet Protocol (IP) address and geographical-location services relying upon IP address are also used to verify end-users or to cross reference likely physical location information related to a user. These methods are limited by the fact that many Internet users obtain a new temporary IP address every time they connect to the Internet instead of maintaining a permanent address (dynamic vs. static IP addresses). The use of IP addresses to pinpoint the location of a connected device is also inherently flawed by the nature in which blocks of IP numbers are distributed and the relative ease of IP spoofing, a technique used by network intruders to make it appear that they are using another device or connecting from a trusted or different IP address.

There is a need for an improved network security fraud detection system. It would be desirable to have a solution that is transparent to the user and implemented alternatively as a standalone solution or as part of an integrated fraud detection and prevention system.

SUMMARY OF INVENTION

The invention provides methods and apparatus for providing network security. Various aspects of the invention described herein may be applied to any of the particular applications set forth below or for any other types of networks that is secured and user accessible. The invention may be applied as a standalone tool or as part of an integrated software solution against online fraud and identify theft. Some preferable embodiments of the invention can be optionally integrated into existing networks and business processes seamlessly including those used by financial and banking institutions. It shall be understood that different aspects of the invention can be appreciated individually, collectively or in combination with each other.

The invention provides systems and methods for creating and analyzing computer tag information for the prevention or detection of potential fraud. Computers and other devices that access the Web may carry device tags in accordance with a preferable embodiment of the invention. These device tags may include date and time information that describes when they were issued by a security tag server. For example, a server time stamp may be inserted into in a computer tag such as a cookie indicating when it was created. In a preferable embodiment of the invention, the computer tag may be a time stamped cookie that includes "date of creation" or "created" data portions. More preferably, such time stamp information can be encrypted and not apparent as is most cookie related information. The computer tags provided herein may be analyzed during future attempts to access a secure network such as a customer attempting to log into an online banking account. When the time stamp information from the tag is compared to other selected information about the account, including but not limited to last account log-in date/time or account creation date, the invention may be able to detect suspicious activity. For example, recently issued computer tags may be flagged as suspicious for accounts that have not been logged into for a long time or for online accounts that were created for quite some time. Accordingly, physical devices involved in suspicious or fraudulent activity, or devices associated with accounts involved in suspicious activity can be prevented from connecting to a network.

Another embodiment of the invention provides an advanced fraud detection and prevention system that can reduce the risk of Internet fraud and identity theft. The system allows a business to detect a potential problem or hacker by spotting a relatively large number or cluster of recently issued computer tags over a period of time. This may suggest suspicious or illegal behavior based on parameters established by online merchants and others conducting business on the Internet including banks and financial institutions. This information can be also used so that a business can make educated decisions about how or whether to authenticate users or customers based at least in part on time stamps, which may be encrypted preferably. The relevant times of when tags and how many are issued for network devices may be also considered in comparison to the history of accounts or resources to which those devices are attempting to access.

In yet another embodiment of the invention, a method is provided for detecting fraud during a connection of a network device or computer to a financial institution server. Initially, an application is launched on a network device such as a Web browser through which an online session can begin. The financial server may determine that the network device is a registered network device having an assigned computer tag with embedded server time stamp information. In preferable embodiments the computer tag may be a cookie with server time stamp information indicating when it was created. The computer tag is then forwarded to a fraud detection system within a secure network environment in which the financial institution server also resides. The fraud detection system then analyzes the creation or issued date of the computer tag from the network device to determine if there is suspected fraud or unauthorized access. This analysis may include decryption procedures when the time stamp information is preferably encrypted. If the server time stamp information does not suggest fraudulent or improper activity, then access to the financial server is granted to the network device.

Another embodiment of the invention provides a network security and fraud detection/prevention system. The system protect a secure network with at least one web server and a network device that connects to the web server over a communications network such as the Internet. The web server may include a fraud detection means that analyzes a time stamped computer tag stored on the network device. When the network device connects to the web server, information is gathered about the network device tag to determine when it was created by the fraud detection means. The fraud detection means may also include a database and means for receiving the time stamped computer tag, storing the tag in the database and associating the tag with user information for possible future use in identifying discernable commonalities or patterns of fraudulent behavior.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The features and advantages of the invention may be described by reference to the following detailed description that sets forth illustrative embodiments and the accompanying figures.

DETAILED DESCRIPTION OF INVENTION

The invention provides systems and methods for fraud detection and prevention. Some of the preferable embodiments of the invention can be applied to detecting and/or preventing attacks on secure networks for online businesses such as financial institutions and banks. It will be appreciated however that the invention may be applied to any type of transaction in which it may be desirable to authenticate a network device or user attempting to access an online accounts or resource over a communications network.

Many aspects of the invention exploit the tendencies of hackers and cyber criminals to remove or modify information that may track or otherwise draw attention to their actions. By monitoring certain activity or events based on when they occur or occurred, an organization can draw associations from account activity from its customers with potentially fraudulent transactions. Illustrated below are embodiments of the invention which employ time stamped device or computer tags that are created by a fraud detection server and reside in the memory of a physical device. These tags may include information such as server time stamp information which relates to when they were created by the fraud detection server. Some embodiments of the invention may provide added security by encrypting the server time stamp information in the tag or the entire tag or cookie so it is less obvious or apparent to would be hackers or others. In particular, the computer tags provided in accordance with the invention may preferably exists as encrypted portions of cookies stored in the memory of devices often sent by servers to Web browsers. It shall be understood that the time stamped computer tags herein may be used in combination with any other information, such as a customer ID number or identifier, a phone number, a drivers license number, a social security number, mailing address, ship to address, credit card number, email address, retail purchase location, and any other information captured during an online purchase or transaction, to identify and minimize transaction fraud and identity theft. Accordingly, the fraud detection systems and methods herein may utilize a time stamped computer tag alone or in combination with a device fingerprint or other data that identifies a device in a relatively unique manner.

Figure 1:
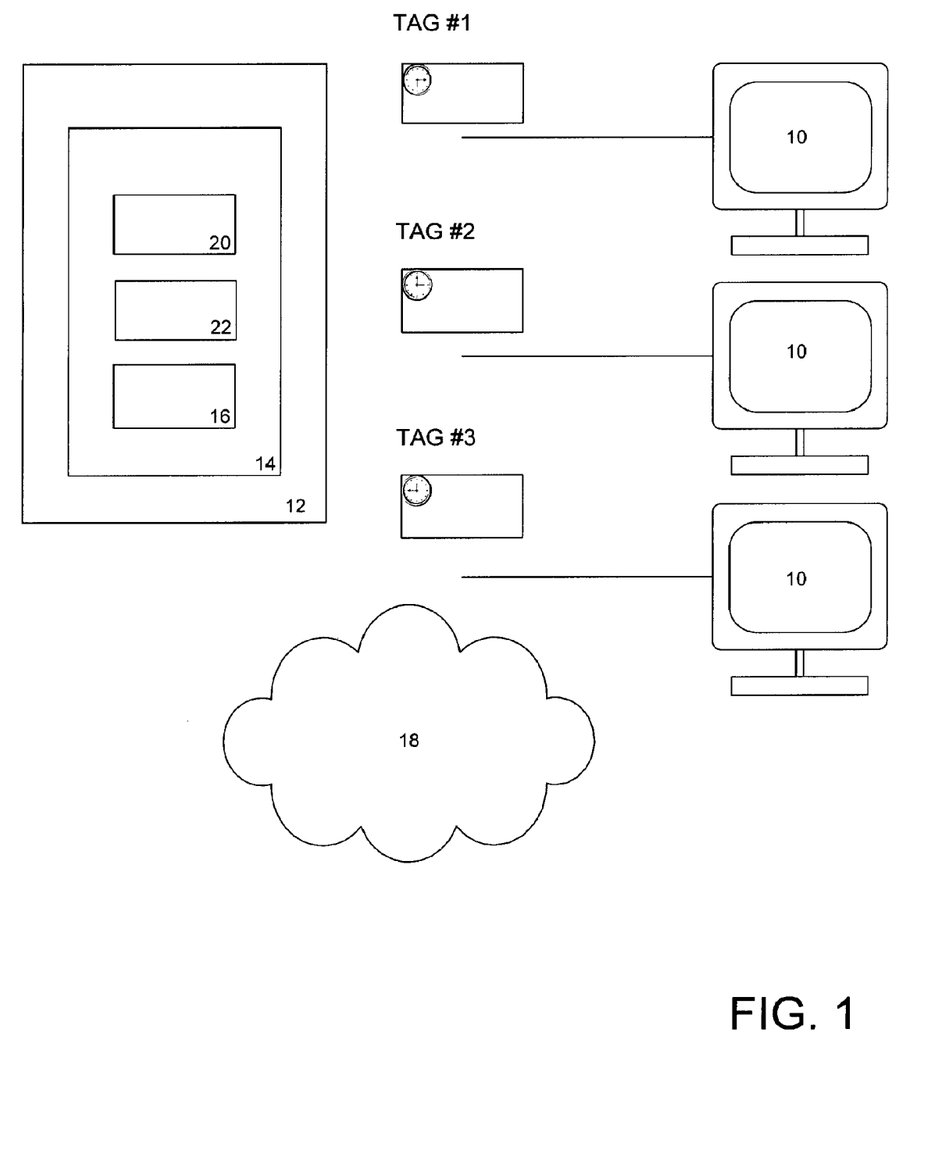
FIG. 1 is a diagram illustrating a computer-implemented electronic transaction network whereby network devices can access a computer network configured with a fraud detection system capable of analyzing time stamped tags associated with network devices

FIG. 1 is a diagram illustrating a computer-implemented electronic transaction system consisting of one or more network devices 10 connectable to a secure network 12. The network 12 may be operated by online businesses such as a financial institution which offer online access to customers or other users. A fraud detection system 14 may be included as a part of or in communication with the network 12. A fraud detection server 16 and a time stamped computer tag database 22 may be included in the fraud detection system for issuing and storing time stamped computer tags in accordance with the invention. In addition, a computer tag analyzer 20 may be incorporated into the fraud detection system for analyzing information within tags such as server time stamp information. The fraud detection system may be a standalone tool or function as part of an overall secure network operated by the financial institution. For example, a financial institution network may be accessible to network devices over a private network or over a communications network 18 such as the Internet (World Wide Web) or any other network that is capable of communicating digital data, including a wireless or cellular network. When the fraud detection server 16 is connected to the communications network 18, the data between network devices 10 such as those used by banking customers, and the fraud detection server may be encrypted or travel over a virtual private network to ensure privacy and security. The network devices 10 may connect to a financial institution network as shown over the communications network 18 using well known data protocols such as HTTP, HTTPS and the like. A financial institution may provide a banking service such as online account access to each network device connected to it, and it may perform electronic transactions with network devices such as authorizing electronic payment or transfer of funds. Such electronic transactions are susceptible to fraud and each network device can be tagged in accordance with the invention to reduce the risk of fraud.

The fraud detection server 16 and computer tag analyzer 20 may receive and process account information and time stamped computer tag information from network devices 10 accessing the secure network 12. At least some of this information can be analyzed by the tag analyzer 20 to determine device related or server time stamp information indicating when the tag was issued by fraud detection server 16. These and other computer analyzers used in accordance with the invention herein include devices that analyze given data such as computer tag and cookie information. They can examine in detail the contents or structure of the given data and can try to find patterns and relationships between parts of the data or other information accessible by the fraud detection system. Such computer analyzers can be pieces of hardware and/or software programs running on one or more computers within the systems provided herein. By analyzing the server time stamp information and comparing it to other known information about the particular account or resource accessible within the network in accordance with an embodiment of the invention, a fraud detection system may detect fraudulent activities across the electronic transaction network. In particular, the fraud detection servers/systems may also uniquely track physical devices, register unique devices, track end-user log-ins, associate an end-user account with one or more specific devices, associate a device with one or more end-user accounts, and consider this information along with other computer tag information.

A preferable embodiment of the invention provides downloaded computer tags or cookies having encrypted server time stamps indicating when they were created and delivered to devices. The use of encrypted time stamps can be implemented with any of the embodiments of the invention described herein. For example, a cookie may be downloaded and stored in device memory. When viewing the contents of the cookie, which is often data in the form of a text file, it is preferable not to make apparent or obvious the existence of the time stamp in order to reduce the risk of cookie tampering. The time stamp information (7/31/2007 7:40 PM) may be encrypted by the fraud detection system according a selected encryption key or algorithm as known in the field. The seemingly irrelevant or indecipherable set of characters (ABC123GH XY45) may have no meaning other than for purposes of the fraud detection system. When the network device attempts to access an account within the secure network, the time stamped cookie is delivered to the fraud detection system for analysis in accordance with the invention (see FIG. 1). The time stamp information may be decrypted by the fraud detection system and reviewed to determine when it was issued by the fraud detection server/system. With this time stamp information, the fraud detection analyzer and system may perform fraud prevention and detection functions in accordance with other aspects of the invention described herein.

For certain applications of the invention, a network device may request access to a electronic transaction network and a particular account for an online business such as e-Bay, Amazon.com, Bank of America, or other e-commerce company. To gain access to the account, complete a transaction, or access a particular part of the network, a user typically completes a log in and authentication procedure through the network device. When the network device has been previously tagged in accordance with the invention, the tag information along with its server time stamp information can be passed onto the fraud detection server and system for analysis. Preferably, at least the server time stamp information in the computer tag is encrypted by the fraud detection server so it is not obvious and readily manipulated. The encrypted time stamp information can be decrypted by the fraud detection server according to whatever encryption algorithms or methods are selected by and known only to or controlled by the online business or financial institution. Moreover, the computer tag may exist in the form of a cookie (a HTTP cookie, a Web cookie) stored in the memory of the device along with other information commonly used to facilitate the exchange of information between a browser and web server. Encrypted time stamp information may be included with the other data usually found in the cookie text files such as an expiration date, a path, and domain name. When the network devices have not been tagged previously, they may be assigned a new computer tag by the fraud detection system in accordance with another embodiment the invention with a time stamp having a current issue date or time. A computer tag may be downloaded to a device from the fraud detection system to perform its "tagging." The system may subsequently request and determine if the device already has a time stamped computer tag from the server or will request a new time stamped computer tag if none exists for the network devicee.

Network Devices

Network devices described herein may be a variety of communication devices including but not limited to a personal computer, server computer, laptop computer, personal digital assistant (PDA) such as a Palm-based device or Windows CE device, a cellular phone, a wireless device such as a wireless email device or other device capable of communicating wirelessly with a computer network or any other computing resource that has the processor, memory and input/output capabilities to be able to communicate with a computer network and handle electronic transactions. The network device may also be a telephone, for example, to order items from a mail order catalog. For many applications of the invention, the network device is a personal computer with a display such as cathode ray tube or liquid crystal display (LCD) for displaying information and images to the user of the network device. One or more input/output devices such as keyboards and a mouse permit the user to operate the network device and to permit it to access the Web. The device can be connected to a communications network via a network interface card, cable modem, a DSL modem, wireless modem, telephone line modem and other hardware. The network device may further comprise one or more processors, memory storage devices, including an optical tape drive or optical drive, a hard disk drive, or flash memory, so the device memory can store data even when the computer system is powered down. Also other a memory such as SRAM, DRAM, or SDRAM may be included to temporarily store data being executed by the processor.

Secure Networks

The secure networks accessed by network devices herein may be a combination of one or more Web-based server computer(s), such as web servers, an application server, a database server, etc., that are capable of communicating with network devices over a communications network, such as the Internet or a wireless network and is capable of downloading web pages or a software application to the network device. The secure network may comprise one or more processors, one or more persistent storage devices and memory. For the secure network to interact with the network devices, the network memory may store (and the processor(s) may run) a server operating system and a transaction processing software system to facilitate electronic transactions between the secure network and network devices.

In another preferable embodiment of the invention, a computer tag system may include server computers within a secure network that can also access databases with related user account history and log-in information. A computer tag may be created, delivered and stored on a client computer preferably as a small block of data or (persistent) cookie that facilitates exchanges with the secure network. The computer tag includes server time stamp information, preferably encrypted by the computer tag system before delivery to the client. In addition, the computer tag may be stored within a computer memory residing on the client computer that is analyzed when connected to the secure network. Furthermore, the computer tag can be delivered to the client computer through conventional methods and imbedded within a common software product like a web browser, or even imbedded in hardware or memory, any of which would be accessible when a connection to the network is established. A computer tag can also be delivered on demand, through a JavaScript, ActiveX control, or similar technology as a user connects to a secure network through a web browser. Other user related information that is accessible to the secure network can be considered together with time stamped computer tag or cookie information provided herein.

Browsers and Cookies

When network devices are communicating with secure networks as described herein, they may run browser software or similar applications. Browsers may be configured to store into a computer memory time stamped computer tags provided in accordance with the invention. The computer tags herein may constitute an entire cookie or included as part of a cookie commonly used with Web browsers. In general, a cookie contains data or messages that facilitate online sessions between network device and (Web) servers or sites over the Internet. For example, a graphical user interface for a personal computer may permit the user to execute a browser application program such as Mozilla Firefox, Netscape Navigator and Microsoft Internet Explorer. The browser options may be selected to enable or allow the download of cookies or computer tags with server time stamp information from fraud detection systems described herein. The information or data within cookies can be modified in accordance in a preferable embodiment of the invention with time stamp information while still allowing them to fulfill their common purpose of identifying users and preparing customized or personalized web pages. One of the benefits of provided by this aspect of the invention is the ability to exploit a relatively small amount of data in a manner that can largely escape the attention of a hacker. Server time stamp information is a piece of information that can be used as a marker for fraudulent activity when pieced together with other account information as described herein. When encrypted/decrypted, this information may become even less noticeable or of concern to hackers yet exploited and recognized in particular by fraud detection systems herein.

During online sessions between user devices and a Web site, cookies can be sent back to servers when logging on or when pages are requested. When a user enters a Web site that uses cookies, certain information about that person such as name and preferences can be requested and retained. This information can be packaged into a cookie along with server time/date (time stamp) information according to a server computer clock that will be sent back to the Web browser and stored for future use. Persistent or permanent cookies are preferably selected herein and stored in a device memory (hard drive) between sessions and logins until it expires at a certain expiration date or is deleted. The next time the user logs on or requests a page or information from the Web site, the browser can send the previously issued cookie along with its package information and time stamp information in accordance with the invention. While the web server can use the cookie information to present customized web pages for the user, a fraud detection system within a site network can also detect the possibility of fraud in accordance with the invention. The time stamp information can be analyzed by the fraud detection system provided herein to determine if the cookie was recently issued. For many authorized users who would not ordinarily delete computer cookies or tags, such time stamp information would not be particularly recent (e.g., weeks, months old). Meanwhile, fraudsters or hackers will often delete cookies from their computers before attacking web servers and computer systems. In some instances, recently issued cookies may be only a few minutes or hours old in comparison to days or weeks. So hacker accesses to web servers will usually result in having either no cookies, in which case they can be immediately issued new time stamped cookies as described herein, or recently issued cookies as determined by a fraud detection system or methods herein. The fraud detection system can consider the frequency and number of recently issued cookies in combination with other patterns or parameters relied upon in detecting potential fraud as designated or relied upon by the online business.

Cookie Building and Storage

The fraud detection server may initiate the storage of a time stamped cookie on a user computer system in a variety of ways. For example, to build and store the cookie, the fraud detection server may generate an identifier to a cookie builder which may correspond to a particular user or not (random or arbitrary). The cookie builder may include the user identifier into the cookie and may add other status information to the cookie, plus a server time stamp. The identifier and the other information may be processed by a cookie signer optionally, which signs the cookie using conventional cryptographic techniques, such as by hashing the identifier, and optionally the other information, using a secret hash key to produce a hash result referred to herein as the cookie signature. The cookie signer may provide the cookie signature, identifier and time stamp information (collectively referred to as the cookie) to a cookie encryptor, which preferably encrypts the cookie using conventional encryption techniques, such as using the public key of a public key/private key pair or using a symmetric key. The cookie encryptor may then direct the cookie to a user browser for storage of the encrypted cookie in cookie storage location on the user computer or device via various communication and network interfaces, and optionally over an SSL connection.

It shall be understood that the storage of the cookies provided herein may be accomplished in conventional memory or disk storage and may be a portion (cookie folder) thereof used for the storage of cookies. Alternatively, the memory may be another part of the user computer system or may reside in a removable device such as a smart card, USB memory token a portable memory device that interfaces to a personal computer through a USB port, such as the USB Memory Key or the like. Although a cookie is selected in this described embodiment, other types of encrypted data or files, certificates or other similar data structures may be used in accordance with the concepts of the invention.

Cookie Analysis

A user may request a page from a Web site through a browser during a session with an online business such as a bank or financial institution. The browser may send a request to a server within a secure network via communication interfaces and network. The communication interfaces can pass the request to a Web application running within the secure network, which can be conventional application programs modified for various applications such as online banking. The Web application may authenticate the user and facilitate various kinds of transactions.

During user authentication or any other time during a session, the fraud detection systems herein may read the encrypted cookie provided by the browser from a cookie storage area. The encrypted cookie may be passed to a fraud detection server and cookie analyzer (see FIG. 1), which can be configured with a cookie decryptor to decrypt the encrypted cookie, and then separate or consider the time stamp information aside from the remainder of the cookie for analysis such as determining how old is the cookie or when it was created.

Additional Fraud Analysis

In another embodiment of the invention, a secure network administrator or fraud analyst can actively screen information for various accounts. These accounts may be identified by the fraud detection system according to time stamped computer tags sharing the same or substantially the same creation date/time. Suspicious accounts may be identified for further investigation by fraud analysts. For example, a number of accounts with stated addresses may be logged in from the same network device with all newly created computer tags—this may be flagged or identified as suspicious. The fraud detection and preventing systems herein may also automatically or manually generate information related to collected time stamped computer tag information to identify spikes or large numbers of computer tags issued or created with a particular server creation date/time.

Furthermore, the invention takes into consideration that many attackers or hackers are likely to access relatively large numbers of different accounts within a particular network and within a particular time frame. Large or massive scale hacking may be performed quickly with automated computers and programs. By comparing accesses to multiple accounts by a device bearing the same or near same computer tag and recent time stamp information, it may be possible to detect patterns of unauthorized access. It shall be understood that the invention may be applied with other systems and methods which authenticate or uniquely identify devices according to a device fingerprint or identifier including but not limited to those described in U.S. patent application Ser. No. 11/241, 739 filed on Sep. 29, 2005, US 2006/0048211 (Pierson et al.) and U.S. Pat. No. 7,100,049 (Gasparini et al.) which are incorporated by reference in their entirety herein.

Additional information about users may be maintained and also used for further fraud analysis by the systems and methods herein such as last successful login date and time, last unsuccessful login date and time, total successful logins, total unsuccessful logins, etc.

Figure 2:
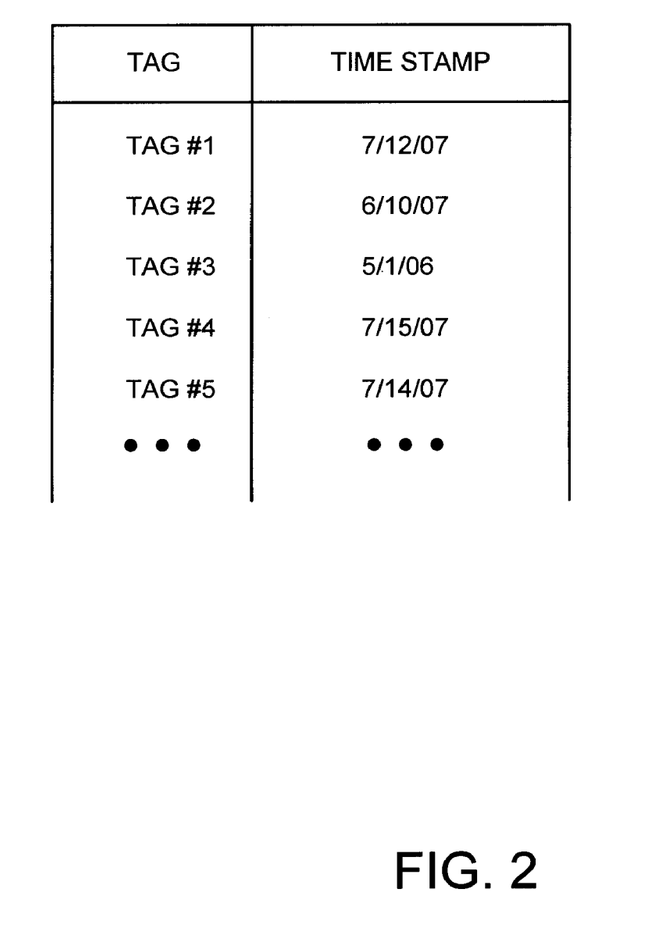
FIG. 2 is a table of tag information with corresponding time stamps that may be analyzed by fraud detection systems provided in accordance with the invention.

FIG. 2 is a computer tag information table listing corresponding time stamps for a set of exemplary tags. Various tag and time stamp tables provided in accordance with this aspect of the invention can be stored in databases and analyzed by fraud detection systems provided herein (see FIG. 1). A tag number (TAG #1) can be any arrangement of numbers and/or characters that are issued by a fraud detection server for devices previously without tags. The time stamp information can be set to a selected computer clock, preferably to a server computer clock for one or more of the fraud detection servers within a fraud detection system. Any format indicating time can be applied to the invention that includes date and/or time information. For example, when time stamps include date information, the month/day/year (7/12/2007) format can be used as illustrated or other formats can be used (7/12/2007, 12/7/07, July 12, 2007). Time stamps provided here can also include hour and minute information in various formats too (4:25 pm, 4:25:55, 16:25 pm PDT). It shall be understood that the various kinds of time stamp information described herein can be stored, modified and encrypted/decrypted as known by those skilled in the art.

A preferable embodiment of the invention provides a fraud detection system that can monitor suspected fraudulent activity by utilizing one or more time stamp databases stored in a computer readable memory. A fraud detection server can access and update a time stamp database with information obtained from computer tags retrieved from devices trying to access a secure network (see FIG. 1). The time stamped computer tags on devices may be analyzed by the fraud detection system to indicate when it was generated and if it was recently issued. Based on the time stamp information retrieved from the network device, by itself or in combination with other available information from an online business, the likelihood of fraud being committed by the particular end-user with the network device is determined so that appropriate action may be taken. For example, when a (threshold) number of accounts are accessed within a predetermined period of time all having recently issued computer tags within a particular period of time (e.g., 1 hour), some or all of these accounts may be flagged for potential fraud and further investigation. In other instances where there may be suspected fraud, a recently issued tag may be received from a device trying to access an account that had not been logged into for a long time. Unless expired or intentionally deleted by a user for a valid purpose, computer tags or cookies are not deleted or disabled from a device in order to permit interaction with most Internet Web sites and servers. Other conditions or possible indicators of unauthorized access include a device trying to access a relatively older account that was created long time ago. It has been observed that many attackers or hackers are likely to remove computer tags such as cookies stored on their computer or device before attempting to access numerous accounts within a secure network. By deleting the cookie or computer tag and/or by accessing a relatively large number of accounts to an online business or financial institution, a significant number of new computer tags may be generated and flagged for possible fraud in accordance with the invention.

In an alternative embodiment of the invention, a network device may be initially granted access to the network and an online account to perform an electronic transaction. If fraudulent activity occurs during this electronic transaction, the time stamp information associated with the network device may be also stored in a database within the fraud detection system for possibly detecting other instances of fraud with network devices having similarly dated computer tags. In this manner, the online business can utilize such fraud information selectively so that a fraud committed in one account is logged into and tracked by the fraud detection system. Accordingly, a user or network device that has committed fraudulent activities may be tracked even when the network device is used to log into a different account.

Furthermore, the fraud detection server/system and computer tag systems herein may comprise administrative components including a web admin module or a reports module. The web admin module may permit administrator level management of the secure network to perform various functions such as to tuning or setting its fraud tolerance levels, inspecting and changing individual customers fraud status, and checking relationships and activity of customers to one another. For example, a financial institution may be able to detect an influx or sudden spike of newly created computer tags associated for the accounts for its online customers within a particular period of time. A reports module may also help a business keep apprised of existing accounts suspected of fraud as well as their historical information.

Fraud Detection Servers and Modules

The fraud detection servers herein may be a stand-alone computing device, such as a server computer, although its functions may be distributed among various devices as described above. The fraud server may include one or more processors and persistent storage devices and memory as described above. The fraud server may further include a database server/manager that stores the time stamped computer tag in accordance with the invention. A fraud detection server memory may store a server operating system, an a variety of software modules including an administrator software module, a fraud detector software module, a reports software module and a tagger software module wherein each module comprises a plurality of instructions (and associated data) that are executed by the processor to implement the fraud detection and preventing system and methods herein.

The administrator module, in a preferable embodiment, may generate administrator web pages that determine how a user can interact with the system and configuring the system. For example, the administrator web pages may permit modification of how the fraud detection server and analyzers process time stamped computer tag information herein.

The reports software module can provides reports with information from the fraud detection and prevention system and its databases. For example, the system may generate a report showing the daily change report such as a fraud report listing the network devices that possessed similar computer tags or cookies created at or around the same date/time, their status, or a shared computer report listing all of the network devices that have multiple computer tags or cookies associated with them.

The fraud detector software module may contain the instructions and logic to process analyzed data relating to the network devices and users. This program may determine relationships and possible correlations between network devices and the time stamped computer tags provided herein.

Figure 3:
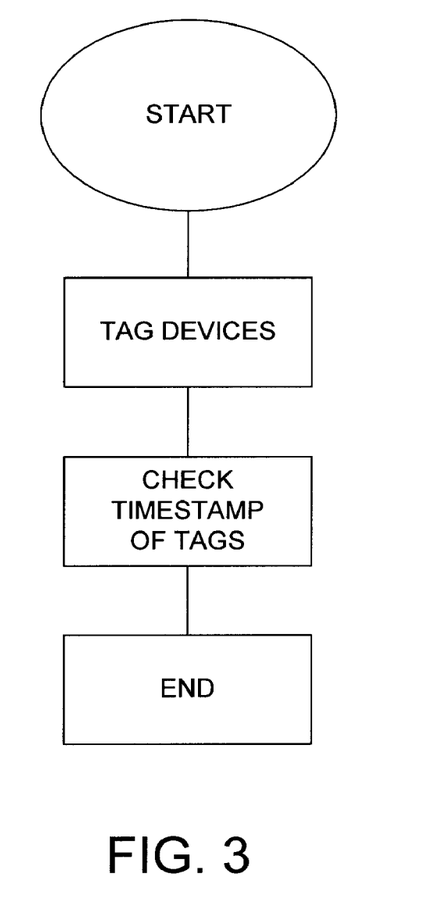
FIG. 3 is a flowchart describing computer tagging and fraud detection methods provided in accordance with the invention.

Another aspect of the invention provides protocols and methods for detecting possible fraud by analyzing time stamped computer tags. As illustrated in FIG. 3, computer tagging and fraud detection methods are provided herein. For example, when a user attempts to log on to a Web site server, the fraud detection system/analyzer may be alerted to check or analyze a time stamped computer tag retrieved from the user device. If the device does not have one already, then a new time stamped computer tag can be generated by the fraud detection server as described herein. New devices can be tagged herein by a variety of methods including the downloading of time stamped cookies containing encrypted creation time/date information stored in device memory. If the device already has a time stamped computer tag, it can be analyzed so that time stamp information can be retrieved. A decryption step may be performed by a computer tag analyzer when time stamp information is encrypted according to methods selected ahead of time by the fraud detection system.

Other embodiments of the invention described below provide alternative methods of tagging network devices in accordance with the invention. Such methods can determine how old is a computer tag or when it was created according to a server time stamp. This may be performed every time a device connects to a secure network, and may also be performed at various points and intervals throughout an online session periodically. When a network device attempts to connect to a network for the very first time, these methods ensure that the device is tagged with computer tag such as a downloaded cookie containing a creation date/time. In preferable embodiments, these methods can unobtrusively store encrypted tags or at least the time stamped portions thereof. This aspect of the invention includes other methods of utilizing the features and functionality provided by the fraud detection and prevention systems described above.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A network security system for a financial institution comprising:
    one or more financial institution web servers, wherein the one or more financial institution web servers create time stamped computer tags;
    one or more customer network devices running a browser and receiving the time stamped computer tags from the financial institution web server, wherein the browser stores into a computer memory the time stamped computer tags;
    a computer network having the financial institution web server accessible by the customer network devices;
    a user account associated with the financial institution web server and accessed by a customer network device via the browser, wherein the financial institution web server includes a time stamped computer tag received from the customer network device over a communications network and associated with the user account; and
    a fraud detection system analyzing the time stamped computer tags received from the network devices to determine when they were created as part of a fraud risk analysis associated with user accounts, the fraud detection system providing an indication of fraud when an amount of time between issuance of the time stamped computer tag and analysis of the time stamped computer tag by the fraud detection system is less than a threshold value for a threshold number of accounts accessed within a predetermined period of time.

2. The system as recited in claim 1, wherein the fraud detection system further comprises a computer tag database having a plurality of records, wherein each record further comprises at least one of the following: a computer tag identifier field, a time stamp field, and a user account information field containing information related to a particular user or a network device.

3. The system of claim 1, wherein the computer tags are embedded in cookies downloadable to the network devices.

4. The system of claim 1, wherein the computer tags are pieces of data that are automatically downloadable to network devices.

5. The system of claim 4, wherein the pieces of data are encrypted.

6. The system of claim 1, wherein the customer network devices include at least one of the following: a cellular phone, a personal digital assistant, a laptop computer, a personal computer and a telephone.

7. The system of claim 1 wherein the browser comprises one or more options that are selectable to enable the download of computer tags with server time stamp information.

8. The system of claim 1 wherein the time stamped computer tags are persistent and stored in network devices' memory between sessions and logins until they expire at an expiration date or are deleted.

9. The system of claim 1 wherein the fraud detection system determines that time stamped computer tags are recently issued when an amount of time between the recently issued time stamped computer tags and analysis of the time stamped computer tags by the fraud detection system is less than a threshold value, and provides the indication of fraud when a number of recently issued time stamped computer tags exceeds a threshold number.

10. The system of claim 1 wherein the time stamped computer tags have corresponding server time stamps.

11. The system of claim 10 wherein the server time stamps are set to a server computer clock.

12. The system of claim 11 wherein the server time stamps have varying formats.

* * * * *